G. A. BEATTIE.
TICKET HOLDER.
APPLICATION FILED MAY 15, 1911. RENEWED JAN. 29, 1915.
1,134,501.   Patented Apr. 6, 1915.
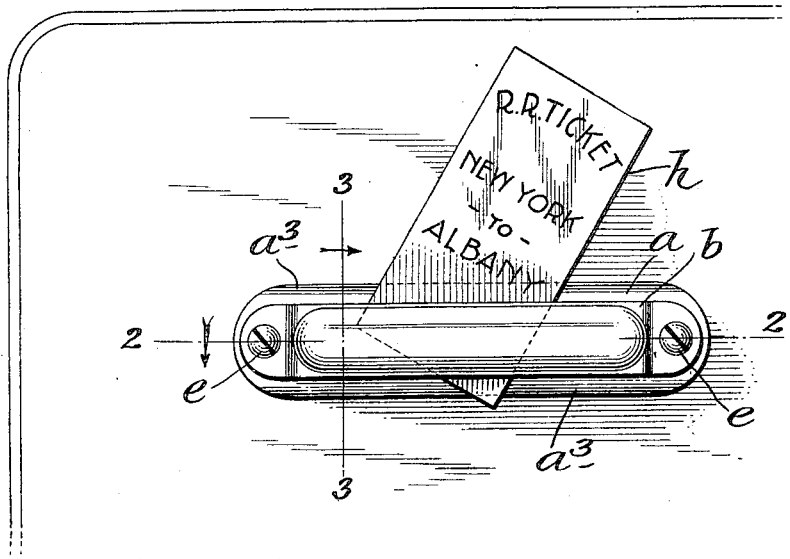
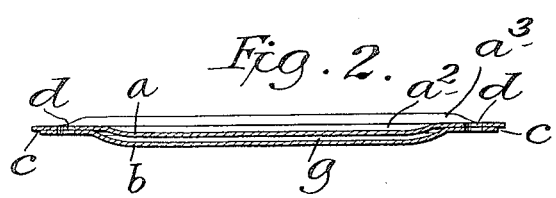
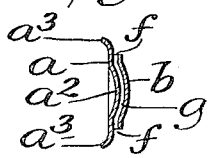
WITNESSES
A. R. Appleman
G. A. Mandeville
INVENTOR
George A. Beattie
BY Edgar Tate & Co.
ATTORNEYS.

UNITED STATES PATENT OFFICE.

GEORGE A. BEATTIE, OF JERSEY CITY, NEW JERSEY.

TICKET-HOLDER.

1,134,501. Specification of Letters Patent. Patented Apr. 6, 1915.

Application filed May 15, 1911, Serial No. 627,319.  Renewed January 29, 1915.  Serial No. 5,137.

*To all whom it may concern:*

Be it known that I, GEORGE A. BEATTIE, a citizen of the United States, and residing at Jersey City, in the county of Hudson and State of New Jersey, have invented certain new and useful Improvements in Ticket-Holders, of which the following is a specification such as will enable those skilled in the art to which it appertains to make and use the same.

This invention relates to ticket holders, card holders and the like and particularly to devices of this class adapted to be secured to and used in connection with car seats for the purpose of holding tickets, conductors' identification slips or similar cards, slips or other articles and the object of this invention is to provide a device of this class which is simple in construction, comparatively inexpensive and which is also ornamental in design and may be secured to the back of a car seat or to any other support where it may be desired to use the same.

The invention is fully disclosed in the following specification of which the accompanying drawing forms a part, in which the separate parts of my invention are designated by suitable reference characters in each of the views, and in which:—

Figure 1 is a back view of a part of a car seat provided with my improved ticket holder; Fig. 2 a longitudinal section through the ticket holder on the line 2—2 of Fig. 1, and; Fig. 3 a transverse section on the line 3—3 of Fig. 1.

My improved ticket holder comprises a back plate $a$ and a front plate $b$ both stamped from sheet metal. The back plate $a$ is provided with a central longitudinal concavo-convex portion $a^2$ of which the convex surface is directed forwardly. At each side of this curved portion, I provide a narrow portion extending in a different direction from the curved part and parallel with the portion of the back $a$ immediately beneath it, and the side edges of the said back plate are curved backwardly as clearly shown at $a^3$ in Fig. 3. Said back plate $a$ is also slightly longer than the front plate $b$ in the form of construction shown, and the end portions of the back and front plates are flush and parallel as shown at $c$ and are secured together in any desired manner. The said end portions of said plates are provided with transverse apertures $d$ through which screws $e$ may be passed for securing the device to a car seat or to any other support.

The front plate $b$ is of less transverse dimension than the back plate and is formed in cross section to correspond with the shape and form of the central portion of the back plate $a$, said front plate being concaved longitudinally of the back side thereof and the front thereof being convex in cross section. At each side of the central curved portion is a narrow part extending at an angle to said curved portion parallel with the portion of the back $a$ beneath it. The extreme side edges of the front plate $b$ are straight and parallel with the corresponding parts of the back plate $a$ as shown at $f$ in Fig. 3, and between said plates at all points except at the end portions thereof where they are secured together is a thin longitudinal space $g$ into or through which a card, ticket or similar device may be inserted or passed as shown at $h$ in Fig. 1.

The main curved portions of the front and back plates are the main holding means, but such holding means would bend the ticket or card so that it would be inclined to the line of vision of any person desirous of inspecting the same, but the narrow edge portions extending at an angle to the central curved portions correct this defect and bring the ticket or card back to an approximately straight position.

It will be understood that the fact that the back plate is wider than the front plate facilitates the use of this device, as it permits the corner of a card to be quickly and easily passed into or through the space $g$, the side portions of the back plate which are beveled or convex in cross section serving as a guide for the corner of the card, and it will also be understood that my improved ticket holder may be made of any desired dimensions both as to length and width.

Having fully described my invention, what I claim as new and desire to secure by Letters Patent, is:—

A ticket holder comprising a base plate having the central portions for a considerable extent longitudinally of the plate curved outwardly transversely leaving plane longitudinally extending marginal guiding portions on each side of the convex portion, said plate having its longitudinal edges bent in a direction away from the convex face of the plate, and an exterior plate of less width than the base plate having its end portions only in contact with the base plate, and the portions between said contacting portions curved throughout its central portion parallel to the convex portion of the base plate, and having longitudinal marginal portions in a plane parallel to the longitudinal guiding portions of the base plate.

In testimony that I claim the foregoing as my invention I have signed my name in presence of the subscribing witnesses this 13th day of May 1911.

GEORGE A. BEATTIE.

Witnesses:
C. E. MULREANY,
FRANK G. ATLEE.

Copies of this patent may be obtained for five cents each, by addressing the "Commissioner of Patents, Washington, D. C."